(No Model.)
G. SCHUBERT.
BALE WIRING TOOL.
No. 501,667. Patented July 18, 1893.
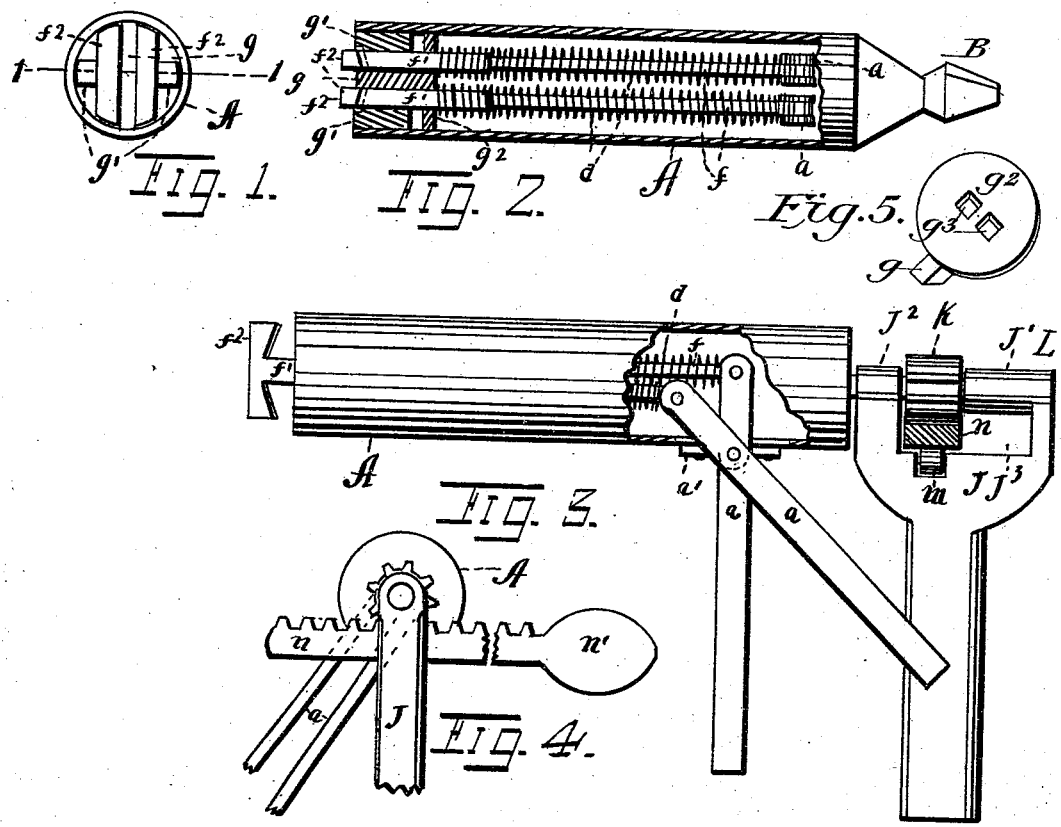
Witnesses
Jas Downey
M Clark
Inventor
George Schubert.

UNITED STATES PATENT OFFICE.

GEORGE SCHUBERT, OF WALNUT, TEXAS.

BALE-WIRING TOOL.

SPECIFICATION forming part of Letters Patent No. 501,667, dated July 18, 1893.

Application filed November 12, 1892. Serial No. 451,727. (No model.)

*To all whom it may concern:*

Be it known that I, GEORGE SCHUBERT, a citizen of the United States, residing at Walnut, in the county of Bosque and State of Texas, have invented certain new and useful Improvements in Bale-Wiring Tools; and I do hereby declare the following to be a full, clear, and exact description of the invention, such as will enable others skilled in the art to which it appertains to make and use the same, reference being had to the accompanying drawings, forming part of this specification, in which drawings—

Figure 1 is a lower end view of my improved bale wiring tool. Fig. 2 is a partial section view on line 1—1 of Fig. 1. Fig. 3 is a side view of the tool, with an improved rotating mechanism. Fig. 4 is an end view of Fig. 3 and Fig. 5 is a perspective view of the guide bar and plate secured in the hollow shank of the tool.

This invention relates to a bale or bundle wiring tool, and consists of a shank of proper length and diameter, with wire clamping and cutting mechanism on its lower end, and mechanism on its other end to rotate said tool.

This tool consists of two independent clamping and cutting jaws, so that one wire can be clamped in the tool, while the other wire can be drawn tight around the bale and then placed in the tool and clamped and cut off, when the tool can be rotated by a brace or by a rack and pinion as shown, and the wire twisted to form a tie.

Referring to the drawings A designates the body of the tool made of proper length and diameter to be inserted between the bars of a baling press to tie the wire direct at the bale.

$a, a$, designate levers pivoted on a fulcrum $a'$ secured on the body of the tool. The shorter ends of the levers $a\ a$ are bifurcated to receive the upper ends of the plunger bars $f$. Said plunger bars $f$ are square at their lower ends $f'\ f'$ and find a guide in the plate $g^2$. Said plate $g^2$ is provided with a T bar $g$ forming the division between the two plungers $f\ f$, and perforated at $g^3$ to secure the lower end of the plungers $f'\ f'$, as seen in Fig. 2.

$g'\ g'$ are guide blocks of proper size on each side of the plungers secured to the body of the tool. Said blocks $g',\ g'$, extend on each side of the square plunger bars $f',\ f'$, (as seen in dotted lines in Fig. 2,) beneath the projections $f^2\ f^2$.

$f^2, f^2$, are anchors or projections formed on the end of the plunger bars $f$, and beveled as shown and adapted to close against the end of the tool.

$d$ designates spiral springs on the plunger bars $f, f$, resting with their lower ends on the plate $g^2$ and with their upper ends against the levers $a, a$, and tend to force said plungers upward.

The wire after taking around the bale and placed beneath the projection $f^2$ which is depressed by elevating its lever $a$, and as the lever $a$ is released the wire is clamped against the end of the tool. The next lever $a$ is now elevated and depressing the other plunger the wire around the bale is now drawn tight and placed beneath the projection $f^2$ and the lever $a$ released clamping the second wire. If the spring is not strong enough to cut the wire off an additional slight downward pressure on the lever $a$ will aid the plunger to cut the wire, after which the tool is rotated to form the tie.

The upper end of the tool can be formed to a shank B to secure a brace, or it can be reduced to a shaft L to receive a pinion K and a handle J bifurcated and journaled with the ends J' and J² on the shaft L on each side of the pinion K, with enough room between the body of the handle and the pinion K to admit the rack bar $n$, and the antifriction roller $m$ which is journaled in said handle J. The pinion K is rigidly secured on the shaft L to rotate the tool as the rack bar $n$ is shifted in either direction. J³ is a vacancy or recess to which the rack bar $n$, can be shifted and withdrawn if so desired without rotating the tool.

$n'$ is a suitable knob for a suitable hand hold.

Having thus described my invention, what I claim is—

1. A bale wiring tool, plungers within a hollow shank, levers $a, a$, pivoted to the shank A to operate the plungers, spiral springs on said plungers, projections $f^2$ on the lower end of the plungers, a bar $g$, and plate $g^2$, within the lower end of said shank, means to rotate said shank, as and for the purpose described, 2. A bale wiring tool, plungers within a hollow shank, levers $a$, $a$, on said shank to operate said plungers, a plate $g^2$ secured in the lower end of the shank A, a division bar $g$, springs on said plunger bars to rest on the plate $g^2$, guides $g'$, $g'$, means to rotate said shank, projections $f^2$ on the plungers, as and for the purpose described.

3. A bale wiring tool, plungers operated within a hollow shank A, levers $a$, $a$, pivoted on the body of the tool to operate the plungers, projections $f^2$ on said plungers, a bar $g$ between said plungers, guides $g'$ $g'$ as shown and for the purpose described.

4. In a bale wiring tool, plungers within said tool, to clamp and cut the wires, a shaft L on the upper end of the tool, a pinion K on said shaft, a handle J bifurcated and journaled on the shaft L, a rack bar $n$ to be inserted between the handle and the pinion K, to rotate the tool, as described.

5. In a bale wiring tool, plungers within said tool to clamp and cut the wires, a shaft L on the upper end of the tool, a pinion K rigid on said shaft, a handle J bifurcated and journaled on each side of the pinion K on the shaft L, a rack bar $n$ to be inserted between the pinion K and the body of the handle J, an antifriction roller journaled in the handle J to operate on the rack bar, as and for the purpose described.

6. In a bale wiring tool, plungers within said tool to clamp and cut the wires, a shaft L on the upper end of the tool, a pinion K rigid on said shaft, a handle J bifurcated and journaled on each side of the pinion K on the shaft L a rack bar $n$ to be inserted between the pinion K and the body of the handle J, a recess $J^3$ as shown and for the purpose described.

In testimony whereof I have affixed my signature in presence of two witnesses.

GEORGE SCHUBERT.

Witnesses:
   JAS. DOWNEY,
   M. HART.